US011641977B2

(12) United States Patent
Dahle et al.

(10) Patent No.: US 11,641,977 B2
(45) Date of Patent: *May 9, 2023

(54) OUTDOOR COOKING STATION, SIDE SHELF, AND METHOD THEREOF

(71) Applicant: North Atlantic Imports, LLC, Logan, UT (US)

(72) Inventors: Roger Dahle, Providence, UT (US); Steve L. Puertas, Wellsville, UT (US); Jeffrey D. Clark, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,114

(22) Filed: Aug. 27, 2021

(65) Prior Publication Data

US 2022/0039598 A1 Feb. 10, 2022

Related U.S. Application Data

(63) Continuation of application No. 17/019,529, filed on Sep. 14, 2020, now Pat. No. 11,116,361, which is a continuation of application No. 16/364,012, filed on Mar. 25, 2019, now Pat. No. 10,779,682.

(60) Provisional application No. 62/648,442, filed on Mar. 27, 2018.

(51) Int. Cl.
*A47J 37/07* (2006.01)

(52) U.S. Cl.
CPC ............... *A47J 37/0786* (2013.01)

(58) Field of Classification Search
CPC .................................................. A47J 37/0786

USPC ............ 108/152; 99/330, 339, 340; 126/9 B, 126/25 R

See application file for complete search history.

(56) References Cited

U.S. PATENT DOCUMENTS

| | | | |
|---|---|---|---|
| 4,291,668 A | 9/1981 | Moeller |
| 4,788,905 A | 12/1988 | von Kohorn |
| 5,016,607 A | 5/1991 | Doolittle et al. |
| 5,076,257 A | 12/1991 | Raymer et al. |
| 5,090,398 A | 2/1992 | Raymer et al. |
| 5,224,676 A | 7/1993 | Johnston |
| 5,323,758 A | 6/1994 | Minshall et al. |
| 5,341,793 A | 8/1994 | Brown |

(Continued)

OTHER PUBLICATIONS

Weber, Manual for Weber Q Griddle, 2006, 2 pages.

(Continued)

*Primary Examiner* — Jose V Chen
(74) *Attorney, Agent, or Firm* — David L. Stott (57) ABSTRACT

Embodiments of a side shelf for coupling to an outdoor cooking station configured to control placement of objects adjacent a cooking surface of the outdoor cooking station. The side shelf includes an upward facing flat surface extending to a front periphery, a rear periphery, an outer periphery and an inner periphery. Further, the upward facing flat surface includes an upstanding elongated ridge, the upstanding elongated ridge extending above the upward facing flat surface and extending at least partially along the inner periphery of the upward facing flat surface. With this arrangement, the upstanding elongated ridge extends to define a set-back from the cooking surface for controlled placement of the objects on the upward facing flat surface.

14 Claims, 5 Drawing Sheets

(56) References Cited

U.S. PATENT DOCUMENTS

| | | |
|---|---|---|
| 5,460,159 A | 10/1995 | Bussey |
| 5,579,755 A | 12/1996 | Johnston |
| 5,791,331 A | 8/1998 | Stewart |
| 5,865,099 A | 2/1999 | Waugh |
| 5,941,229 A | 8/1999 | Schlosser et al. |
| 6,062,129 A | 5/2000 | Tippmann et al. |
| 6,142,140 A | 11/2000 | Shumaker |
| 6,145,431 A | 11/2000 | Tippmann et al. |
| 6,324,998 B1 | 12/2001 | Alden et al. |
| 6,354,548 B1 | 3/2002 | Stephen et al. |
| 6,439,222 B1 | 8/2002 | Dixon et al. |
| 6,755,187 B2 | 6/2004 | Harrod et al. |
| 6,792,936 B2 | 9/2004 | Wagner et al. |
| 6,910,476 B2 | 6/2005 | Johnson et al. |
| D537,295 S | 2/2007 | Debord et al. |
| D541,588 S | 5/2007 | McKenzie |
| 7,328,696 B2 | 2/2008 | Rodriguez |
| 7,753,046 B2 | 7/2010 | Bruno et al. |
| 7,798,139 B2 | 9/2010 | Gagas et al. |
| 7,958,882 B1 | 6/2011 | Sgourides |
| 8,051,768 B2 | 11/2011 | Stephen et al. |
| 8,074,635 B2 | 12/2011 | Bruno et al. |
| D707,084 S | 6/2014 | Miller |
| 9,782,039 B2 | 10/2017 | Ortner et al. |
| 9,826,859 B1 | 11/2017 | Steele |
| 10,779,682 B2 * | 9/2020 | Dahle ................ A47J 37/0786 |
| 11,116,361 B2 * | 9/2021 | Dahle ................ A47J 37/0786 |
| 2004/0154608 A1 | 8/2004 | Ward et al. |
| 2006/0048765 A1 | 3/2006 | Bruno et al. |
| 2011/0283992 A1 | 11/2011 | DeMars |
| 2013/0074822 A1 | 3/2013 | Chien et al. |
| 2013/0312732 A1 | 11/2013 | Brennan |
| 2019/0365152 A1 | 12/2019 | Dahle et al. |
| 2020/0008615 A1 | 1/2020 | Dahle et al. |
| 2020/0093330 A1 | 3/2020 | Dahle et al. |

OTHER PUBLICATIONS

Weber, Product Page for Weber Q 1200 Grill, http://www.weber.com/grills/series/weber-q-series/1200, available as of Oct. 5, 2016, 4 pages.

amazon.com, Product Page for Weber 6558 Griddle for Q1000 Series Grill, available as of Apr. 6, 2016, 5 pages.

A&J Manufacturing, LLC, Defendant's Disclosure of Invalidity Contentions, *North Atlantic Imports, LLC*, v. *A&J Manufacturing, LLC*, Case No. 1:22-cv-02436-VMC (N.D. Ga ), Oct. 14, 2022, 13 pages.

A&J Manufacturing, LLC, Exhibit A—Invalidity Chart—Bruno, *North Atlantic Imports, LLC*, v. *A&J Manufacturing, LLC*, Case No. 1:22-cv-02436-VMC (N.D. Ga.), Oct. 14, 2022, 28 pages.

A&J Manufacturing, LLC, Exhibit B—Invalidity Chart—Johnson, *North Atlantic Imports, LLC*, v. *A&J Manufacturing, LLC*, Case No. 1:22-cv-02436-VMC (N.D. Ga.), Oct. 14, 2022, 32 pages.

A&J Manufacturing, LLC, Exhibit C—Invalidity Chart—Weber Q, *North Atlantic Imports, LLC*, v. *A&J Manufacturing, LLC*, Case No. 1:22-cv-02436-VMC (N.D. Ga.), Oct. 14, 2022, 20 pages.

A&J Manufacturing, LLC, Exhibit D—Invalidity Chart—Bussey, *North Atlantic Imports, LLC*, v. *A&J Manufacturing, LLC*, Case No. 1:22-cv-02436-VMC (N.D. Ga.), Oct. 14, 2022. 24 pages.

* cited by examiner

OUTDOOR COOKING STATION, SIDE SHELF, AND METHOD THEREOF

CROSS-REFERENCE TO RELATED APPLICATIONS

The present application is a continuation of U.S. patent application Ser. No. 17/019,529, filed Sep. 14, 2020, which is a continuation of U.S. patent application Ser. No. 16/364,012, filed Mar. 25, 2019, which claims the benefit of U.S. Provisional Application No. 62/648,442, filed Mar. 27, 2018, the disclosures of which are hereby incorporated by reference herein in their entirety.

TECHNICAL FIELD

The present invention relates generally to outdoor type cooking stations and, more specifically, the present invention relates to a side shelf attachable to the outdoor type cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

Managing food, cooking utensils and various spices and the like adjacent the cooking surface of the grill often becomes problematic for the individual cooking. To overcome this problem, many of the barbeque grills or outdoor cooking stations include some sort of side shelf attached to the cooking station. Such side shelves are typically positioned adjacent the cooking surface of the grills or the like to provide easy access and appropriate management of the cooking area. However, due to the proximity of the side shelves to the cooking surface and the heat rising from the cooking surface, dangerous conditions may arise that may not be immediately apparent to the individual cooking at the cooking station.

BRIEF SUMMARY OF THE INVENTION

The present invention is directed to various embodiments of a safety feature for a cooking station and side shelf. In one embodiment, an outdoor cooking station for controlling placement of objects adjacent a cooking surface of the outdoor cooking station. The outdoor cooking station includes a main body and a side shelf. The main body extends to define a front side, a rear side, a first side and a second side each extending between a lower portion and an upper edge. The upper edge extends with a rectangular periphery along each of the front side, the rear side, the first side and the second side of the main body. Further, the main body includes multiple heating elements supported by the main body and disposed below the upper edge of the main body such that the multiple heating elements are configured to provide heat to the cooking surface. The side shelf is configured to be coupled to one of the first side and the second side of the main body, the side shelf including an upward facing flat surface extending to an inner periphery. The upward facing flat surface extending to an upstanding elongated ridge, the upstanding elongated ridge extending above the upward facing flat surface and extending at least partially adjacent the inner periphery. With this arrangement, the upstanding elongated ridge extends to define a set-back from the cooking surface for placement of the objects on the upward facing flat surface.

In another embodiment, the side shelf includes an elongated opening defined in the side shelf, the upstanding elongated ridge extending at least partially along the elongated opening. In another embodiment, the side shelf includes an elongated opening defined therein, the elongated opening extending through the side shelf such that, upon the side shelf being secured to one of the first side and the second side of the main body, the elongated opening defines a gap opening between the main body and the upstanding ridge.

In another embodiment, the set-back defined by the upstanding elongated ridge is sized and configured to substantially prevent the objects from being positioned within a heat zone, the heat zone associated with the cooking station upon the heating elements being ignited. In still another embodiment, the upstanding elongated ridge extends with a majority of its elongated length extending linearly so as to extend substantially parallel with the one of the first side and the second side of the main body.

In another embodiment, the side shelf includes a first downward extension and a second downward extension, the first and second downward extensions extending downward from the inner periphery of the upward facing flat surface and including coupling structure configured to couple to the one of the first side and the second side of the main body. In still another embodiment, the upstanding ridge integrally extends from the upward facing flat surface.

In accordance with another embodiment of the present invention, a side shelf for coupling to an outdoor cooking station configured to control placement of objects adjacent a cooking surface of the outdoor cooking station is provided. The side shelf includes an upward facing flat surface extending to a front periphery, a rear periphery, an outer periphery and an inner periphery. The upward facing flat surface including an upstanding elongated ridge, the upstanding elongated ridge extending above the upward facing flat surface and extending at least partially along the inner periphery. With this arrangement, the upstanding elongated ridge extends to define a set-back from the cooking surface for controlled placement of the objects on the upward facing flat surface.

In another embodiment, the side shelf further includes a first downward extension and a second downward extension, the first and second downward extensions extending downward from the inner periphery of the upward facing flat surface and adjacently from opposite ends of the upstanding elongated ridge, the first and second downward extensions including coupling structure configured to couple to a main body of the outdoor cooking station. In another embodiment, upon the first and second downward extensions being coupled to the main body of the outdoor cooking station, the upstanding elongated ridge extends to define an elongated gap opening between the elongated ridge and the main body. In another embodiment, the upstanding elongated ridge extends adjacent an elongated opening defined in the side shelf, the elongated opening extending alongside the upstanding elongated ridge.

In another embodiment, the set-back defined by the upstanding elongated ridge is sized and configured to substantially prevent the objects from being positioned within a heat zone, the heat zone associated with the cooking station upon the heating elements being ignited. In yet another embodiment, the upstanding elongated ridge extends with a majority of its length extending linearly so as to extend substantially parallel with the outer periphery of the upward facing flat surface. In another embodiment, the upstanding elongated ridge integrally extends from the upward facing flat surface. In still another embodiment, the upstanding elongated ridge extends with a curve along opposite end portions of the upstanding elongated ridge.

In another embodiment, the upward facing flat surface extends to a front trim extension, a rear trim extension, and an outer side trim extension, the outer side trim extension extending between the front and rear trim extensions, each of the front and rear trim extensions and outer side trim extension extending downward and substantially perpendicular relative to the upward facing flat surface.

In accordance with another embodiment of the present invention, a method of controlling placement of objects adjacent a cooking surface of a cooking station is provided. The method includes the steps of: providing a side shelf coupled to one of a first side and a second side of a main body of an outdoor cooking station, the side shelf including an upward facing flat surface for placing objects thereon, the upward facing flat surface including an upstanding elongated ridge that extends above the upward facing flat surface; and substantially controlling placement of objects on the upward facing flat surface with a set-back defined by the upstanding elongated ridge, the upstanding elongated ridge extending adjacently along one side of the upward facing flat surface so as to substantially prevent objects from being placed within a heat zone adjacent the cooking surface.

In another embodiment, the method step of providing includes providing an elongated opening defined between the upstanding elongated ridge of the side shelf and the main body of the cooking station. In another embodiment, the method step of providing includes providing the upstanding elongated ridge to extend linearly along a majority of its elongated length and substantially parallel with the one of the first side and the second side of the main body.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
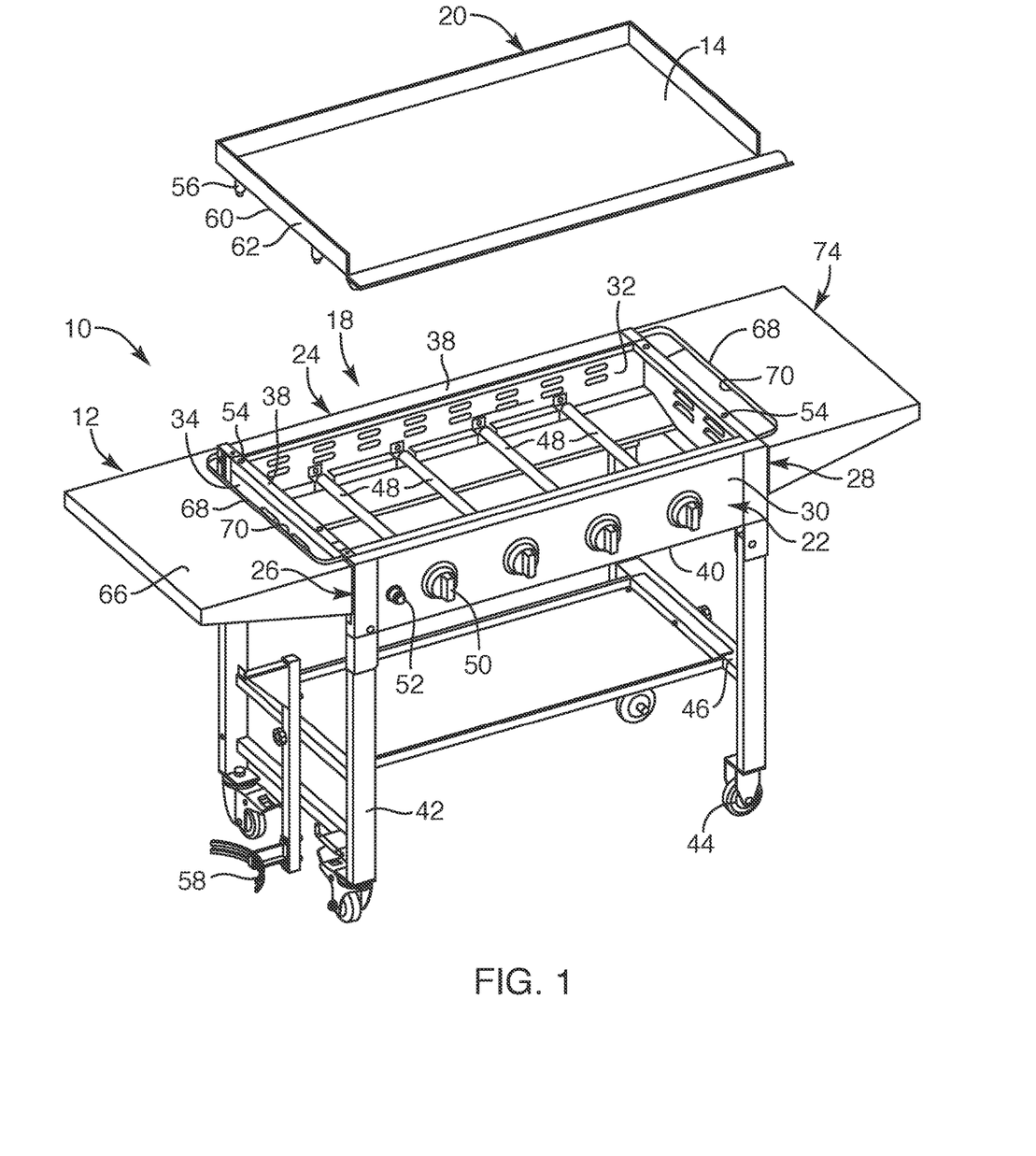
FIG. 1 is a perspective view of a cooking station with a griddle member positionable over the cooking station, depicting the cooking station having first and second side shelves attached to the cooking station, according to an embodiment of the present invention.
Figure 2:
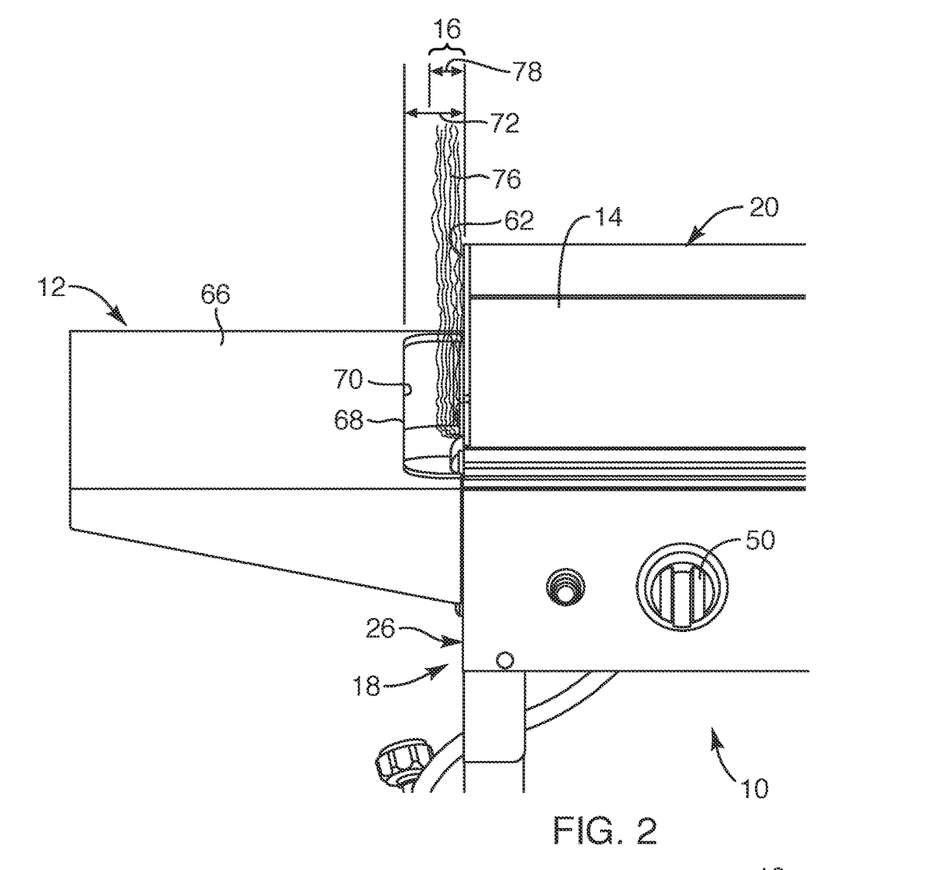
FIG. 2 is a partial front perspective view of one side shelf coupled to the cooking station, depicting the side shelf having a set-back relative to a heat zone associated with the cooking station, according to another embodiment of the present invention.

Referring to FIGS. 1 and 2, embodiments of a cooking station 10 and a side shelf 12 for coupling thereto are provided. Such side shelf 12 may include one or more structural set-back features sized and configured to substantially control placement of objects, such as pressurized canisters or cooking oil or any other object, from being placed too close to a cooking surface 14 or within a heat zone 16 of the cooking station 10. The cooking station 10 may be an outdoor type cooking station for barbequing and the like, typically fueled by propane or natural gas (not shown), or any other suitable fuel, such as briquettes or the like. Further, the cooking station 10 may be sized and configured to be a portable cooking station. The cooking station 10 may be sized and configured with a grill type cooking surface for grilling food, or the cooking station 10 may be sized and configured for receiving a griddle member 20, or the cooking station 10 may be adapted with a combination grill and griddle member. Other versions or combination versions of an outdoor cooking station may also be employed with the side shelf 12 having one or more structural set-back features for controlling the placement of items or objects on the side shelf 12, discussed in further detail herein. In this manner, the side shelf 12 with the one or more structural set-back features may be employed as a safety feature for the cooking station 10.

Now with reference to FIG. 1, in one embodiment, the cooking station 10 may include a main body 18 sized and configured to receive the griddle member 20. The main body 18 may include a front side 22 and a rear side 24 each extending between a first side 26 and a second side 28 of the main body 18. The main body 18 may include frame components and panel structures secured to the frame components. The panel structures may include a front panel 30, a rear panel 32, a first side panel 34 and a second side panel 36 sized and configured to be secured to the frame components along the respective front side 22, rear side 24, first side 26 and the second side 28 of the main body 18. The front and rear panels 30, 32 may extend horizontally between the horizontally extending first and second side panels 34, 36. Each of the panel structures of the main body 18 may extend vertically between an upper edge 38 and a lower edge 40 or lower portion of the main body 18. Such upper edge 38 may include apertures 54, such as four apertures, to receive corresponding griddle legs 56 extending from an underside of the griddle member 20. Upon positioning the griddle member 20 over the upper edge 38 of the main body, the griddle legs 56 suspend the griddle member 20 above the upper edge 38 to define a gap 64 therebetween (see FIG. 3).

In one embodiment, the front and rear panels 30, 32 may be longer than the first and second side panels 34, 36 so that the upper edge 38 of the main body 18 defines a rectangular periphery. In another embodiment, the frame components and panel structures may be sized so that the upper edge 38 of the main body 18 may extend with a generally square shaped periphery. The main body 18 may also include legs 42, such as four legs, extending downward from the main body 18. Each of the legs 42 may include caster wheels 44 or the like to facilitate portability of the cooking station 10. In another embodiment, two of the legs 42 may include the caster wheels 44 at a lower end thereof. Further, the legs 42 may include cross-members 46 extending between, for example, respective front legs and rear legs of the cooking station. The cross-members 46 may provide support to the legs 42 and the main body 18 as well as support to a tray or the like that may be positioned over the cross-members 46. Other structures may also be supported by the cross-members 46, such as a propane tank holder 58.

Each of the front and rear panels 30, 32 and the first and second side panels 34, 36 may extend over the frame components to define a space therebetween. Such space may include structural components, such as some of the frame components, to support multiple heating elements 48 or flame burners, such as four heating elements. Each of the heating elements 48 may hold structure for feeding pressurized fuel, such as propane gas, therethrough and controlled with burner control valves 50 or knobs adjacently along or on the front panel 30. In addition, the front panel 30 may include an ignitor switch 52 that may be depressed to provide a spark to ignite the gas fueled heating elements 48. The cooking station 10 may include typical components to facilitate heating the cooking surface 14 associated with the cooking station 10, such as various valves, tubing, manifold, gas couplings, fasteners, and any other necessary components, as known to one of ordinary skill in the art.

Figure 3:
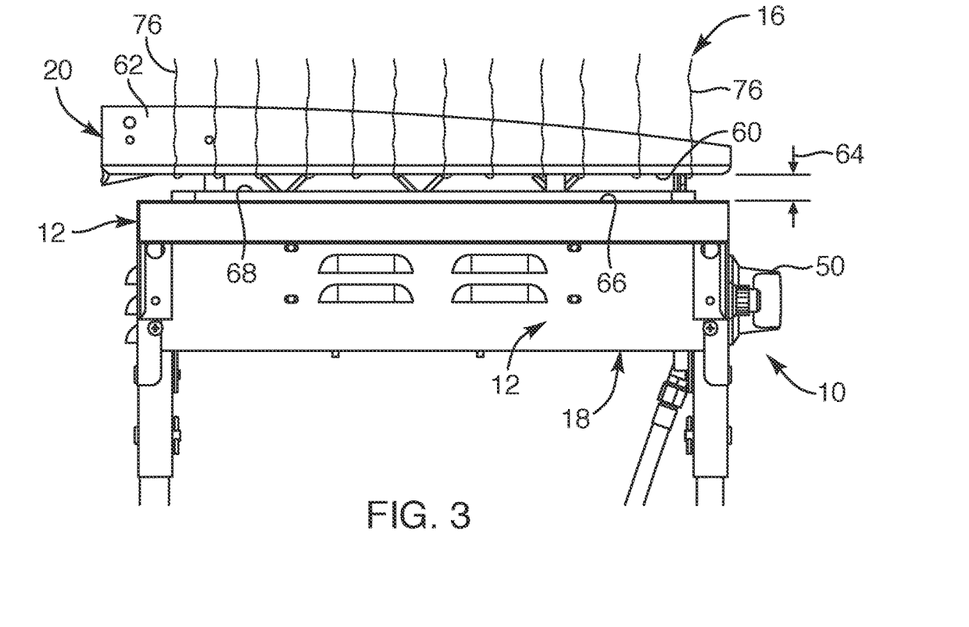
FIG. 3 is a side view of the side shelf and cooking station, according to another embodiment of the present invention.
Figure 4:
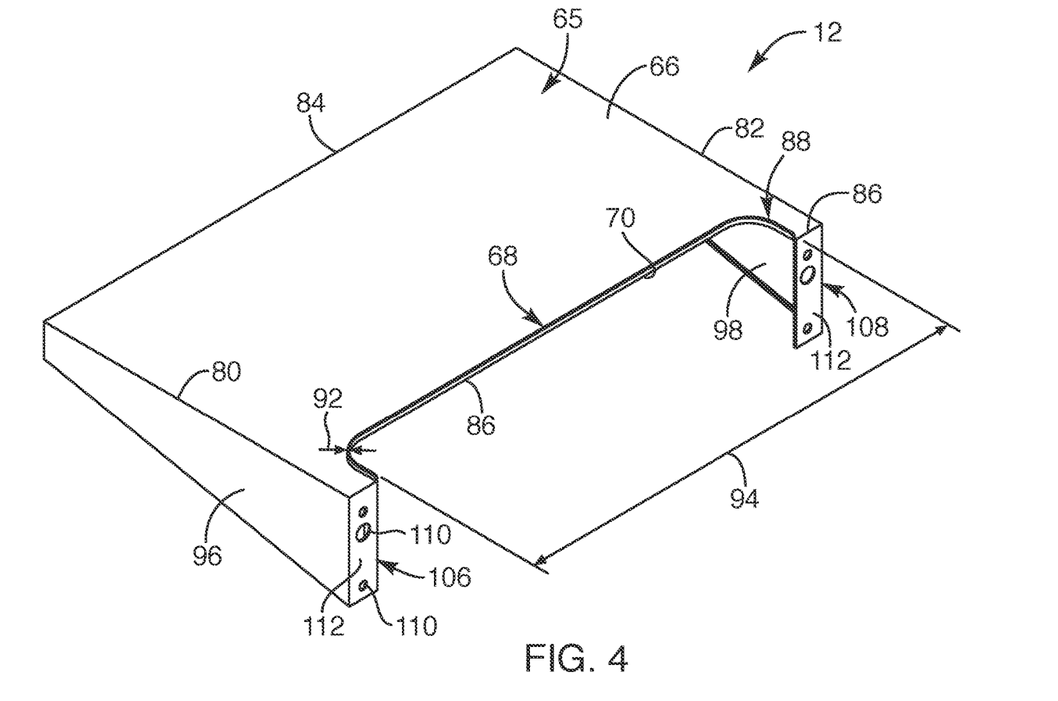
FIG. 4 is an inner side perspective view of the side shelf, depicting a ridge and opening arrangement of the side shelf, according to another embodiment of the present invention.
Figure 5:
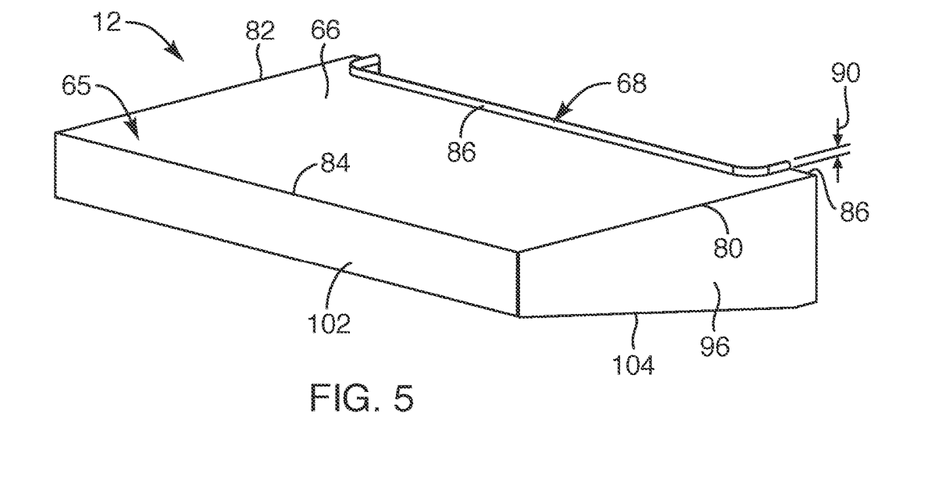
FIG. 5 is an outer side perspective view of the side shelf, depicting another view of the ridge and opening arrangement of the side shelf, according to another embodiment of the present invention.
Figure 6:
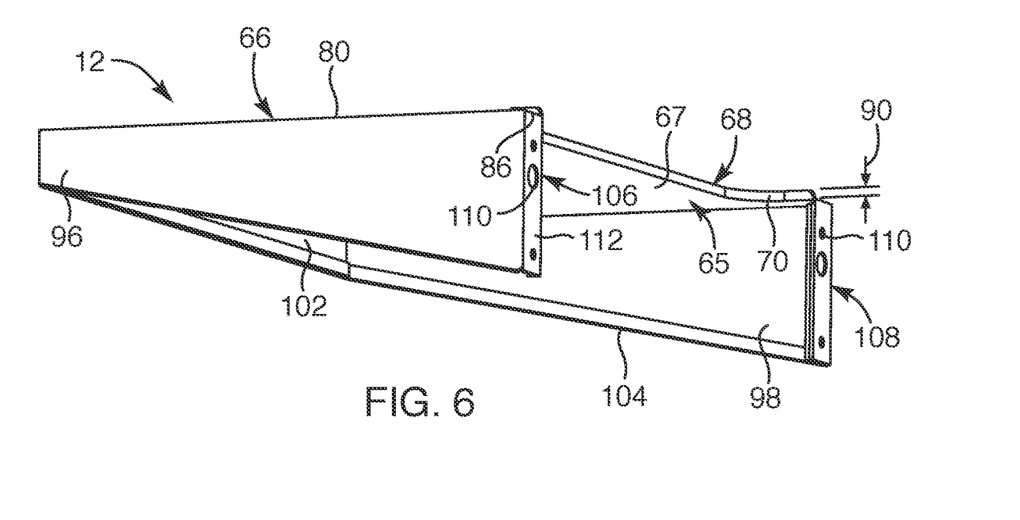
FIG. 6 is a bottom perspective view of the side shelf, according to another embodiment of the present invention.
Figure 7:
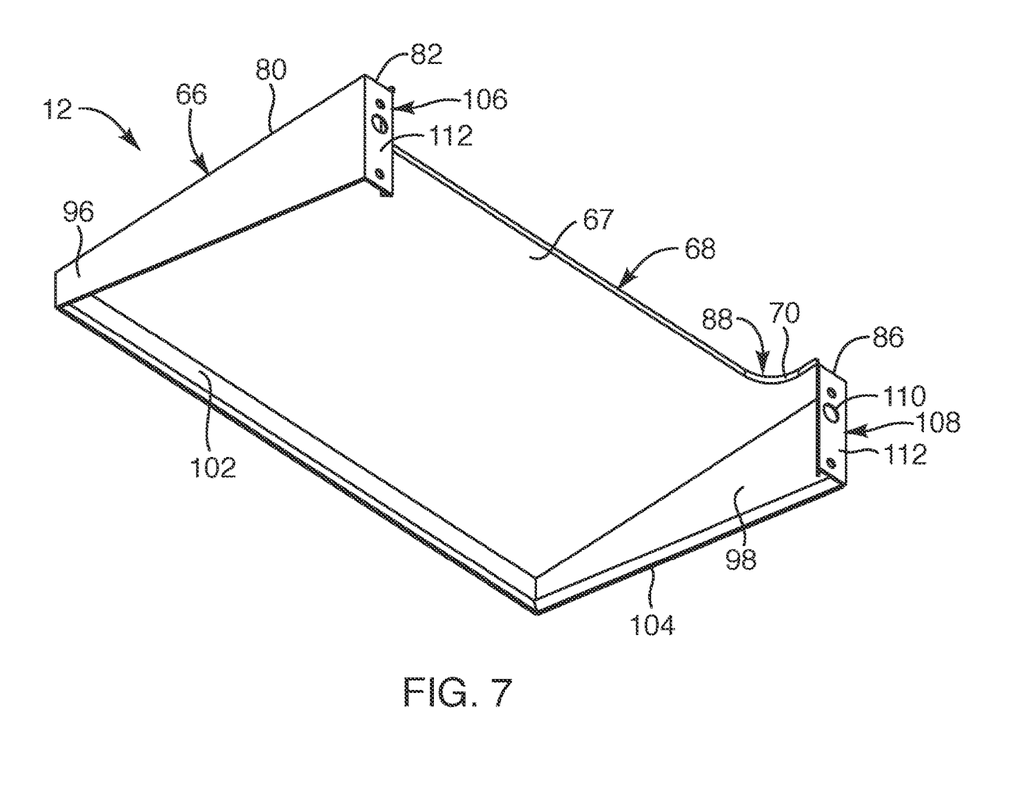
FIG. 7 is another bottom perspective view of the side shelf, according to the present invention.

With reference to FIGS. 1, 2 and 3, upon igniting the fuel being fed through the heating elements 48, heat may be generated in a controlled manner with the burner control valves 50 to heat the cooking surface 14, such as the griddle member 20. Heat rising from the heating elements 48 to heat an underside of the griddle member 20 may continue to provide heat flow 76 out from under the griddle member 20 between the upper edge 38 of the main body and a peripheral edge 60 of the griddle member 20, i.e., the gap 64, and then upward along a peripheral side 62 of the griddle member 20. Such heat flow 76 from under the griddle member 20 creates the heat zone 16 defined along the peripheral side 62 of the griddle member 20. Such heat zone 16 in some cases, as depicted, may extend beyond a periphery of the main body 18 of the cooking stove 10 or peripheral side 62 of griddle member 20. In another embodiment, a cooking station may be adapted to receive a pot or pan or the like, which may also create similar heat zones that may extend beyond the cooking surface of the cooking station.

As previously set forth, the side shelf 12 may include structure sized and configured to substantially prevent placement of objects within the heat zone 16. For example, in one embodiment, the side shelf 12 (also may be referenced as a first side shelf) may include an upward facing flat surface 66 and an upstanding elongated ridge 68, the elongated ridge 68 extending upward above the upward facing flat surface 66 so as to create a boundary or barrier that may discourage individuals at the cooking station 10 from placing objects thereon. Further, in another embodiment, the elongated ridge 68 may extend along an elongated opening 70 or elongated recess defined in the side shelf 12. Such elongated opening 70, upon the side shelf 12 being secured to the main body 18, may define a set-back 72 between the upstanding elongated ridge 68 and one of the first and second sides 26, 28 of the main body 18. Such set-back 72 (or, in this case, the width of the elongated opening 70) may provide a buffer from the heat zone 16 such that the set-back 72 may be sized and configured to be larger than a width or depth 78 of the heat zone 16. In this manner, such upstanding elongated ridge 68 and elongated opening 70 arrangement may be sized and configured to define the set-back 72 to assist users of the cooking station 10 to place objects on the upward facing flat surface 66 in a safe manner, such as away from the before-described heat zone 16 extending upward adjacent the cooking surface 10.

In one embodiment, the cooking station 10 may be sized and configured to include a second side shelf 74 such that the before referenced side shelf 12 may be referenced as a first side shelf 12. Each of the first and second side shelves 12, 74 may define the elongated ridge and opening 68, 70 arrangement, as described above. Further, the first and second side shelves 12, 74 may be coupled to the main body 18 so that the upward facing flat surface 66 may be substantially level with the upper edge 38 of the main body 18. In another embodiment, the first and second side shelves 12, 74 may be coupled to the main body 18 so that the upward facing flat surface 66 may be positioned below the upper edge 38 of the main body 18. The first and second side shelves 12, 74 may be designed to be substantially identical, such that they can be interchangeably attached to the first and second sides 26, 28 of the main body 18.

In another embodiment, the first and second side shelves 12, 74 may include different features or the same features, but one side shelf may include additional features or structural characteristics. For example, each of the first and second side shelves 12, 74 may include the elongated ridge and opening 68, 70 arrangement and one of the first and second side shelves 12, 74 may also include structure for receiving a cutting board, a paper towel holder, and/or a garbage bag holder, similar to that described and depicted in commonly assigned U.S. application Ser. No. 15/885,313, filed Jan. 31, 2018, entitled Portable Outdoor Cooking Device, System, and Accessory Thereof, the disclosure of which is incorporated herein by reference in its entirety.

Now with reference to FIGS. 4-7, the side shelf 12 will now be described in detail. In one embodiment, the side shelf 12 may include a main shelf portion 65. The main shelf portion 65 may include the upward facing flat surface 66 and an underside surface 67, the underside surface 67 facing directly opposite the upward facing flat surface 66. Such upward facing flat surface 66 may be the primary shelf surface or main shelf surface upon which users may position objects while cooking at the cooking station 10. Upon the side shelf 12 being secured to the main body 18 of the cooking station 10, the upward facing flat surface 66 may extend and be positioned substantially horizontally, extending substantially orthogonal relative to an outer surface of one of the first side panel 34 or the second side panel 36 of the main body 18 (see FIG. 1). The upward facing flat surface 66 may extend with a substantially rectangular or square periphery, but for the elongated opening 70 or elongated recess defined along one side of the upward facing flat surface 66. For example, the upward facing flat surface 66 may extend to a front periphery 80, a rear periphery 82, an outer periphery 84 and an inner periphery 86. The outer periphery 84 may extend between the front and rear periphery 80, 82. The inner periphery 86 may extend adjacent to (with a portion against) one of the first side 26 and second side 28 of the main body 18 of the cooking station 14, upon the side shelf 12 being secured thereto. Further, the inner periphery 86 may define the elongated opening 70 or recess, as previously set forth, such that the inner periphery 86 may not be linear along its entire length. In another embodiment, the inner periphery 86 of the upward facing flat surface 66 may be linear along its entire length or a majority of its length in a version, for example, where the elongated opening 70 is defined entirely within the upward facing flat surface 66.

Further, the upward facing flat surface 66 may include the before described upstanding elongated ridge 68, which in one version, may extend along a portion of the inner periphery 86. Such elongated ridge 68 may extend linearly along a majority of its length along a portion of the boundary defining the elongated opening 70 or elongated recess. In one embodiment, the elongated ridge 68 may include arcuate portions 88 such that end portions of the upstanding elongated ridge 68 curve to then extend to ends of the elongated ridge 68. In another embodiment, the elongated ridge 68 may follow along a contour of a periphery of the elongated opening 70. In another embodiment, the elongated ridge 68 may be a single elongated ridge. In another embodiment, the side shelf 12 may include multiple elongated ridges extending above the upward facing flat surface 66. In another embodiment, the elongated ridge 68 may extend with a curve along a majority of its length. In another embodiment, the elongated ridge 68 may extend linearly between the front and rear periphery 80, 82 of the upward facing flat surface 66. In another embodiment, the elongated ridge 68 may include a continuous height and depth along its longitudinal length. In another embodiment, the elongated ridge 68 may extend with a continuous loop, depending on the elongated opening 70 or elongated recess defined therein. In another embodiment, a linear portion of the elongated ridge 68 may extend longitudinally so as to extend substantially parallel with one of the first and second side panels 34, 36 of the main body 18. In another embodiment, a linear portion of the elongated ridge 68 may extend longitudinally so as to extend substantially parallel with the outer periphery 84 of the upward facing flat surface 66. In another embodiment, the upstanding elongated ridge 68 may be in and maintain a fixed position relative to the upward facing flat surface 66. In another embodiment, the upstanding elongated ridge 68 may be fixed so as to be secured in a non-pivoting or non-slidable manner relative to the upward facing flat surface 66. In another embodiment, the elongated ridge 68 may be formed integrally with the side shelf 12. In still another embodiment, the elongated ridge 68 may be formed as an insert to be secured, via fasteners or an interference type fit, along the elongated opening 70 or elongated ridge.

The elongated ridge 68 may include a height 90, a length 94, and a depth 92. The height 90 of the elongated ridge 68 may be a distance that extends beyond and above the upward facing flat surface 66. The height 90 of the elongated ridge 68 may define the highest most structure of the side shelf 12, upon the side shelf 12 being secured to the main body 18 of the cooking station 10. In one embodiment, the height 90 of the upstanding elongated ridge 68 may extend with a constant and continuous height along the entire length of the elongated ridge 68. In another embodiment, the height 90 may vary along portions of the length 94 of the elongated ridge, for example, the height 90 may taper along end portions so as to taper in height along the arcuate portions 88 toward the ends of elongated ridge 68. The height 90 of the upstanding elongated ridge 68 may be within the range of 3 millimeters and 15 millimeters and preferably within the range of about 5 millimeters and 10 millimeters. Importantly, the height 90 of the upstanding elongated ridge 68 should be sufficient height to discourage users from placing objects thereon.

The length 94 of the elongated ridge 68 may be substantially longer than the height 90 and the depth 92 of the elongated ridge 68. In one embodiment, a length of the arcuate portions 88 and linear portions of the elongated ridge 68 may correspond with and extend a length of the periphery defining the elongated opening 70 or elongated recess. In another embodiment, the length 94 of the elongated ridge 68 may extend about a length of the elongated portion of the elongated opening 70 or elongated recess. In still another embodiment, the length 94 of the elongated ridge 68 may extend proximate to the length between the front periphery 80 and the rear periphery 82 of the upward facing flat surface 66. In another embodiment, the elongated ridge 68 may include end portions that extend transverse or orthogonal relative to a majority of the length of the elongated ridge 68. The depth 92 of the elongated ridge 68 may be a depth dimension similar to the thickness of sheet material. In another embodiment, the depth 92 of the elongated ridge 68 may be formed by folding over sheet material to leave a clean edge and, as such, the depth may be about twice the thickness of the sheet material employed. The depth 78 of the elongated ridge 68 may be smaller than the height 90 of the elongated ridge 68.

Each of the front periphery 80, the rear periphery 82, and outer side periphery 84 of the side shelf 12 may extend integrally downward to exhibit trim portions, such as a corresponding front trim portion 96, a rear trim portion 98 and an outer trim portion 102. Each of the trim portions may extend downward so that bottom ends 104 of the trim portions may fold inward or fold over so as to substantially eliminate exposed sharp edges.

As previously set forth, the inner periphery 86 may extend to the upstanding elongated ridge 68 and along the elongated opening 70 defined in the side shelf 12. Further, the inner periphery 86 of the side shelf 12 may extend to a first downward extension 106 and a second downward extension 108, each extending downward from the upward facing flat surface 66 along the inner periphery 86. The first downward extension 106 may extend from the inner periphery 86 and adjacent the front periphery 80 of the upward facing flat surface 66. The second downward extension 108 may extend from the inner periphery 86 and adjacent the rear periphery 82 of the upward facing flat surface 66. Each of the first and second downward extensions 106, 108 may include coupling structure 110, such as openings or notches sized and configured to receive fasteners or the like. The first and second downward extensions 106, 108 each include an abutment surface 112, the abutment surface 112 sized and configured to abut to one of the first and second sides 26, 28 of the main body 18 of the cooking station 10 (see FIG. 1). The abutment surface 112 and the first and second downward extensions 106, 108 may extend substantially perpendicular relative to the upward facing flat surface 66. With this arrangement, the abutment surface 112 of the first and second downward extensions 106, 108 may be positioned against one of the first and second sides 26, 28 of the main body 18 so that fasteners or the like may be employed to secure the side shelf 12 to the main body 18 with the coupling structure 110 defined in the first and second downward extensions 106, 108.

Figure 8:
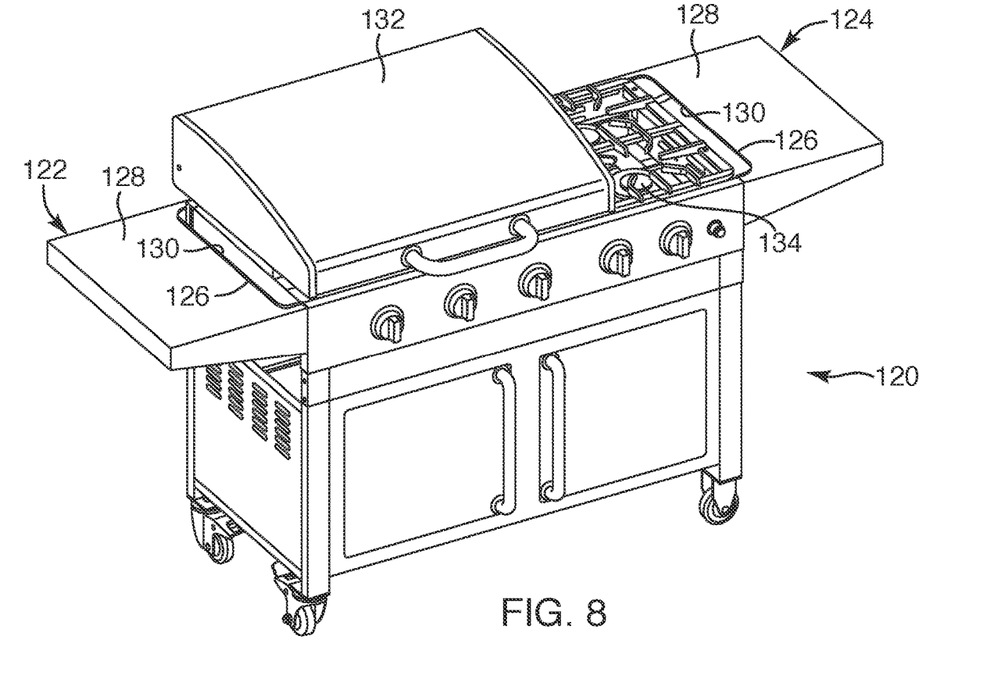
FIG. 8 is a perspective view of another embodiment of a cooking station with first and second side shelves coupled thereto, according to the present invention.

Now with reference to FIG. 8, another embodiment of a cooking station 120 that may employed with first and second side shelves 122, 124 is provided. In this embodiment, the first and second side shelves 122, 124 may each include an elongated ridge 126 extending above a main flat surface 128 and an elongated opening 130 defined in each of the side shelves, the elongated ridge 126 extending along the opening 130, as described in detail in previous embodiments. Further, the side shelf, such as the first side shelf 122, may be employed adjacent to a hood 132 associated with the cooking station 120. The cooking surface under the hood 132 may be a grill type cooking surface or a griddle type cooking surface. Further, the second side shelf 124 may be employed adjacent to heating elements 134 with, for example, a range for positioning pots or pans thereover. As such, the side shelf, such as the second side shelf 124, as described in previous embodiments, with the elongated ridge 126 and opening 130 arrangement may be employed with most any type of cooking station 120 to provide a set-back 72 (FIG. 2) as a safety feature to assist users of the cooking station 120 from placing objects within any potential heat zones 16 (FIG. 2) associated with the cooking station 120.

Figure 9:
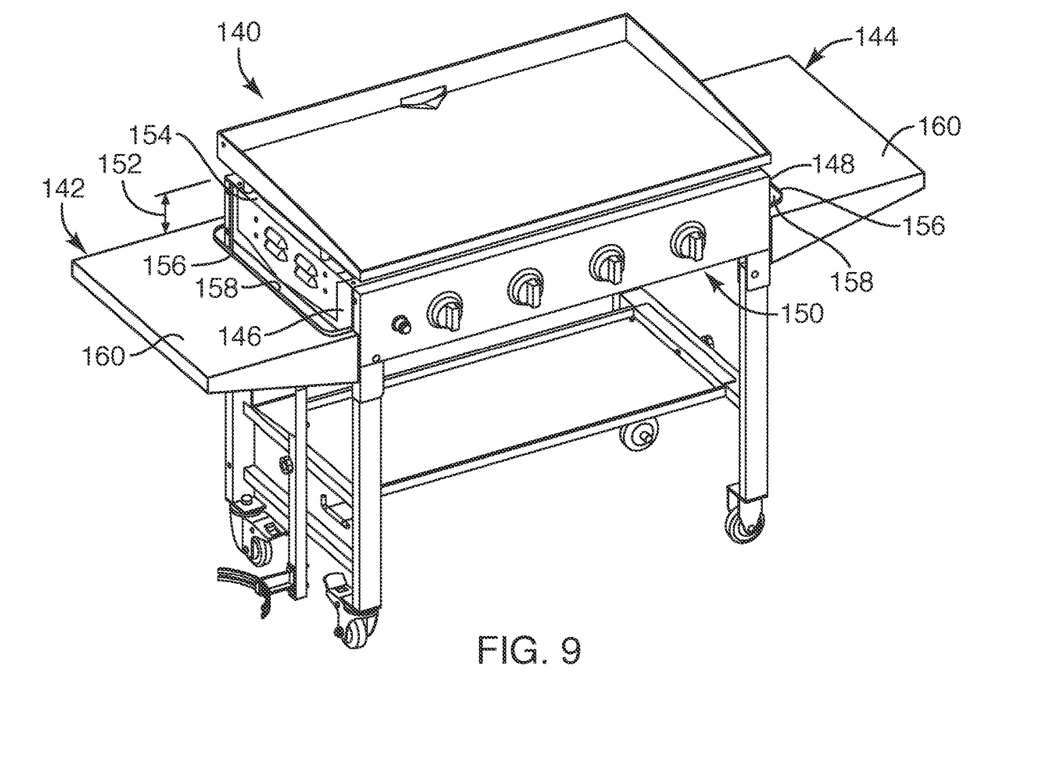
FIG. 9 is a perspective view of another embodiment of a cooking station, depicting first and second side shelves coupled to the cooking station below the cooking surface, according to the present invention.

With respect to FIG. 9, another embodiment of a cooking station 140 that may be employed with a first and second side shelf 142, 144 is provided. In this embodiment, the first and second side shelves 142, 144 may be positionably secured to respective first and second sides 146, 148 of a main body 150 of the cooking station 140. Further, in this embodiment, the first and second side shelves 142, 144 may be positionably secured to the cooking station a distance 152 below an upper edge 154 of the main body 150. Similar to previous embodiments, the first and second side shelves 142, 144 may each include an elongated ridge 156 that may extend along an elongated opening 158 such that the elongated ridge 156 extends above an upward facing flat surface 160 or main surface of the first and second side shelves 142, 144. In this manner, the elongated ridge 156 may provide a set-back 72 (FIG. 2) to discourage users from placing objects on the first and second shelves 142, 144 within a heat zone 16 (FIG. 2) associated with heating the cooking station 140. In another embodiment, the first and second side shelves 142, 144 may be secured to the cooking station 140 so that the upward facing flat surface 160 is positioned above the upper edge 154 of the main body 150 such that the upward facing flat surface 160 may be disposed at a level of the cooking surface or above the cooking surface of, for example, a griddle member or grill disposed on the main body 150 of the cooking station 140.

The various structural components of the various embodiments of the cooking station and the side shelf and any other structural components thereof may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station, comprising:
a main body extending to define a front side, a rear side, a first side and a second side each extending between a lower portion and an upper edge, the upper edge extending with a rectangular periphery along each of the front side, the rear side, the first side and the second side of the main body, the main body including multiple heating elements supported by the main body and disposed below the upper edge of the main body;
a griddle member removably positionable above the heating elements of the main body and configured to be supported by structure adjacent the upper edge of the main body, the griddle member including a cooking surface and an opposite underside surface; and
a side shelf configured to be coupled to one of the first side and the second side of the main body so as to be positionable against the one of the first side and the second side of the main body to define an upward facing flat surface, the upward facing flat surface extending to an upstanding elongated ridge, the upstanding elongated ridge defining a height, the height of the upstanding elongated ridge extending upward above the upward facing flat surface so as to extend along an elongated opening defined in the side shelf, the elongated ridge at least partially extending longitudinally and linearly with the height of the elongated ridge so as to extend between a front shelf side and a rear shelf side of the side shelf so that the elongated ridge extends substantially parallel and adjacently along the one of the first side and the second side of the main body.

2. The outdoor cooking station of claim 1, wherein the upstanding elongated ridge extends to define a set-back from the griddle member for placement of objects on the upward facing flat surface of the side shelf.

3. The outdoor cooking station of claim 2, wherein the set-back defined by the upstanding elongated ridge is sized and configured to substantially prevent the objects from being positioned within a region of heat flow, the heat flow moving upward along a side of the griddle member from under the griddle member while the heating elements are ignited.

4. The outdoor cooking station of claim 1, wherein the upstanding elongated ridge and the elongated opening extend longitudinally adjacent the one of the first and second sides of the main body so as to define a set-back from the griddle member as a safety feature for placement of objects on the upward facing flat surface of the side shelf.

5. The outdoor cooking station of claim 1, wherein the upstanding elongated ridge extends linearly along a majority of a length of the elongated ridge.

6. The outdoor cooking station of claim 1, wherein the upstanding elongated ridge extends linearly along a majority of a length of the elongated ridge with end portions of the elongated ridge extending with a curve therealong.

7. The outdoor cooking station of claim 1, wherein the upstanding elongated ridge protrudes upward from the upward facing flat surface.

8. The outdoor cooking station of claim 1, wherein the underside surface of the griddle member includes legs extending therefrom, the legs sized and configured to be positioned within apertures defined in the upper edge of the main body so as to suspend the underside surface of the griddle member above the upper edge of the main body.

9. An outdoor cooking station configured to control placement of objects relative to a heat zone of the outdoor cooking station, comprising:

a main body extending to define a front side, a rear side, a first side and a second side each extending between a lower portion and an upper edge, the upper edge extending with a rectangular periphery along each of the front side, the rear side, the first side and the second side of the main body, the main body including multiple heating elements supported by the main body and disposed below the upper edge of the main body; and a side shelf configured to be coupled to one of the first side and the second side of the main body so as to be positionable against the one of the first side and the second side of the main body to define an upward facing flat surface, the upward facing flat surface extending to an upstanding elongated ridge, the upstanding elongated ridge defining a height, the height of the upstanding elongated ridge extending upward above the upward facing flat surface so as to extend along an elongated opening defined in the side shelf, the elongated ridge at least partially extending longitudinally and linearly between a front shelf side and a rear shelf side of the side shelf so that the elongated ridge extends substantially parallel and adjacently along the one of the first side and the second side of the main body.

10. The outdoor cooking station of claim 9, wherein the upstanding elongated ridge and the elongated opening extend longitudinally adjacent the one of the first and second sides of the main body so as to define a set-back from the heat zone for placement of objects on the upward facing flat surface of the side shelf in a safe manner.

11. The outdoor cooking station of claim 9, wherein the upstanding elongated ridge extends linearly along a majority of a length of the elongated ridge with end portions of the elongated ridge extending with a radial component.

12. The outdoor cooking station of claim 9, further comprising a griddle removably positionable above the heating elements, the griddle extending with an underside surface and a cooking surface such that, upon the griddle being positioned above the heating elements and the heating elements being ignited, heat moves along the underside surface of the griddle and creates the heat zone along a periphery of the griddle.

13. The outdoor cooking station of claim 12, wherein the underside surface of the griddle includes legs extending therefrom, the legs sized and configured to be positioned within apertures defined in the upper edge of the main body so as to suspend the underside surface of the griddle above the upper edge of the main body.

14. The outdoor cooking station of claim 9, wherein the upstanding elongated ridge protrudes upward from the upward facing flat surface of the side shelf.

* * * * *